United States Patent [19]

Issel

[11] 3,977,233
[45] Aug. 31, 1976

[54] PROCESS AND APPARATUS FOR THE DETERMINATION OF CONCENTRATION PROFILES OF LIQUID OR GASEOUS SUBSTANCES

[76] Inventor: Wolfgang Issel, Bahnhofstrasse 2, 75 Karlsruhe 1, Germany

[22] Filed: July 3, 1975

[21] Appl. No.: 592,877

[30] Foreign Application Priority Data
July 3, 1974 Germany............................ 2431907

[52] U.S. Cl.............................................. 73/40.5 R
[51] Int. Cl.²........................................... G01M 3/04
[58] Field of Search................. 73/40.5 R, 40.7, 23, 73/19, 421.5 R, 40

[56] References Cited
UNITED STATES PATENTS
3,276,247  10/1966  Bunn................................ 73/40.5 R
3,531,264  9/1970  Greipel............................ 73/40.5 R

*Primary Examiner*—Donald O. Woodiel
*Attorney, Agent, or Firm*—Craig & Antonelli

[57] ABSTRACT

Process and apparatus for the determination of concentration profiles of liquid or gaseous substances along a path length, for example, crude oil and gas pipeline installations, wherein a length of hollow conduit filled with a column of test medium is laid along a path length, the hollow conduit being constructed to permit diffusion of the substances thereinto establishing a distribution corresponding to the concentration profile to be determined and the column of test medium is pushed through the hollow conduit at chronological intervals past a sensor sensitive to the substances.

11 Claims, 5 Drawing Figures

PROCESS AND APPARATUS FOR THE DETERMINATION OF CONCENTRATION PROFILES OF LIQUID OR GASEOUS SUBSTANCES

This invention relates to a process for the determination of concentration profiles of liquid or gaseous substances along a certain length and moreover relates to an apparatus for conducting the process.

The invention is utilized for determining the presence and accurate local distribution of liquid and gaseous substances in the air and in the ground, as well as for the detection and location of leaks in product pipelines laid underground or above-ground and serving for the transportation of liquid and gaseous products, especially in this connection concerning leaks of long-distance pipelines for crude oil.

A number of different methods and devices have been known for some time in order to detect damage to pipelines.

None of the conventional processes or suggested devices has become popular in practice, because either the expenses for the required equipment were too high and/or the measuring accuracy was too low. For this reason, nowadays even crude oil long-distance lines are still monitored for leaks merely by an optical method, namely by observing the pipeline from the air or from the ground.

The invention has the objective of proposing a process and apparatus permitting in a simple manner the determination of concentration profiles of gaseous and liquid substances along a certain path length in order to be able to constantly monitor even great distances at low expense, with a short response time, and a high locating accuracy.

This objective is attained by providing that a hollow conduit is laid along the distance [path length] and is filled with a test medium, this conduit being designed so that the substances can diffuse into its interior and produce in the test medium a distribution corresponding to the concentration profile to be determined, and that the column of test medium is pushed at time intervals through the conduit and is moved past a sensor [probe] sensitive to the substances. The term "diffuse into" is understood herein and in the following to mean the entrance of atomic, molecular and/or colloidal particles of the liquid or gaseous substance on account of their Brownian molecular movement into the interior of the hollow conduit, whereby gradually an equilibrium is established between the liquid and/or vapor phase of the respective substance outside and inside of the hollow conduit. A suitable hollow conduit is either a pipe or a hose filled with a gaseous or liquid test medium in accordance with the requirements. According to the invention, an entire concentration profile of the substances along the path length can be recorded easily, i.e. for example the local distribution of impurities of air or groundwater along the hollow conduit which latter can have a length of several kilometers and more. If the conduit is laid in parallel with a crude oil or gas long-distance pipeline, it is possible with the aid of the specific concentration profile along the long-distance pipeline to detect not only a single leak, but also several leakage points during the process of one determination, wherein not only the location of the leak is detected, but also the amount of the substance leaked into the ground (crude oil, gas) can be concluded therefrom. The process is suitable for automatic monitoring, as long as the pushing step is initiated by measures taken at time intervals, and the sensor is connected not only to writer-recorders, but also to alarm devices.

In an embodiment of the process of this invention, a minor volume of a substance to which the sensor is likewise sensitive is introduced into the conduit as a distance marker before the column of test medium is moved therein. This volume of substance serves advantageously as a distance marker to increase the location accuracy of a leak; if necessary, in case of very long lines, it is also possible to effect such introduction at several places. These distance markers are recognized by the sensor just as the substances which may diffuse into the conduit, and from their chronological occurrence, a conclusion can readily be drawn regarding their original position in the pipeline and thus regarding the site of the leak.

The apparatus for the determination of concentration profiles of liquid or gaseous substances along a certain length for conducting the process of this invention consists of a hose lying along the path length and filled with a test medium, this hose being designed so that the substances can diffuse into the interior thereof; a pump provided at one end of the hose, serving for displacing the test medium; and a sensor sensitive to the substances, which is likewise arranged at one end of the hose. The required construction of the hose can be different; a pressure pump or a suction pump can be employed; and the sensitivity of the sensor is dependent on the type of substances, the concentration profile of which is to be determined.

In an advantageous embodiment, the hose consists of polyethylene, through which the substances can diffuse. Other suitable synthetic resins can also be utilized in place of polyethylene; depending on the composition of these synthetic resins, they allow different substances to diffuse.

In accordance with another important feature of the invention, valves which automatically close under pressure or vacuum are arranged at spacings in the wall of the hose. In this case, the substances to be determined do not diffuse through the wall of the hose, but rather through the openings created with the aid of the valves into the interior of the hose, the valves closing as soon as the pump begins to displace the test medium, thereby creating superatmospheric or subatmospheric pressure within the hose (or in a pipe). The concentration profile to be determined is obtained in this case by interpolation of the individual values determined in the zone of each valve.

In another important embodiment of the invention, a dosing device permitting the introduction of a substance is provided at one end of the hose. With the aid of this device, a distance marker can be placed into the column of test medium, and the observation of this marker by means of the sensor entails an increase in the locating accuracy.

For the purpose of allowing the substances, the concentration profile of which is to be determined, to diffuse into the hose, the latter can also have a kidney-shaped cross section and can be provided at intervals with open slots which close automatically when pressure or vacuum is produced in its interior. These slots correspond to the above-mentioned valves, but such a design of the hose can be manufactured considerably more economically.

The sensor can include ion-selective measuring elements and/or measuring probes for the electric conductivity of water. In connection with distilled water as the test medium, the thus-constructed device is especially suitable for monitoring groundwater drainage areas for the penetration of undesired, dissolved substances.

The invention will be explained in greater detail below with reference to the appended drawings wherein.

An apparatus for the determination of concentration profiles for liquid as well as gaseous substances along a certain path length consists of a hose 1, a pump 2, and a sensor 3.

Figure 1:
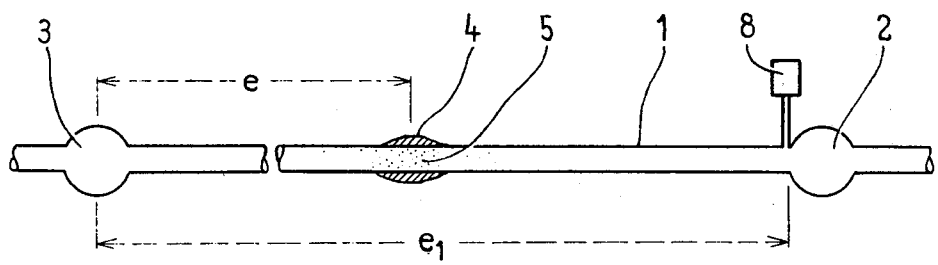
FIG. 1 shows an apparatus for the determination of concentration profiles shown schematically in a longitudinal sectional view.

The hose 1 lying along the distance, the concentration profile of which is to be determined (see FIG. 1) consists of a material through which the substances can diffuse into the interior of the hose; this hose 1 is filled with a test medium. The length can be, for example, a crude oil long-distance pipeline (not shown), and the substance which diffuses is accordingly crude oil; in this case, air is suitably selected as the test medium. However, the path length can also be located in a groundwater drainage area, in which case the substances are undesired materials dissolved in the groundwater, and advantageously distilled water is used, for example, as the test medium in the hose 1.

As soon as an accumulation of matter 4 — e.g. crude oil emanating from the leak in a crude oil long-distance line — comes into the vicinity of the hose 1 (see FIG. 1), the substance to be detected diffuses into the hose 1 at this location and forms, in the zone of the matter accumulation 4, a vapor plug 5 in the interior of the hose in the test medium (for example air). However, on both sides of this vapor plug 5, the test medium in the hose remains pure.

The pump 2 is located at one end of the hose 1, while the sensor 3 is disposed on the opposite end of the hose. At chronological intervals, the pump 2 pushes the column of test medium present in the hose 1 through the latter and thus moves the column past the sensor 3.

A dosing device 8 is provided directly upstream of the pump 2 at the end of the hose 1 where the pump 2 is located; this dosing device makes it possible to introduce into the interior of the hose 1 a minor volume of a substance to which the sensor 3 is likewise sensitive.

Figure 2:
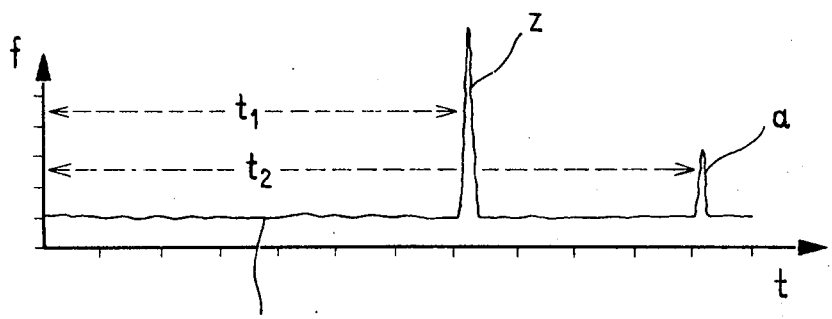
FIG. 2 shows a recording of a tracer instrument connected to an apparatus as shown in FIG. 1.

The sensor 3 controls a tracer instrument (not shown); the recording of such a tracer instrument is shown in FIG. 2, wherein the sensor signal $f$ is plotted over the pumping time $t$. As long as the pure test medium passes by the sensor 3, the tracer instrument records a basic value $g$; however, as soon as the vapor plug 5 reaches the sensor 3, the tracer instrument writes a spike $z$, the height and width of which is a measure for the magnitude of the matter accumulation 4. With the aid of the determined pumping time $t_1$ — meaning the time elapsed since the turning on of the pump 2 up to the appearance of the spike $z$ in the tracer instrument — it is possible (see FIG. 1) to determine the distance $e$ of the matter accumulation 4 from the sensor 3 and thus the location of the leakage point in the crude oil long-distance pipeline.

To increase the accuracy of such a locating procedure, a small amount of a substance (to which the sensor likewise responds) can be pressed into the hose 1 as a distance marker by means of a device provided at the site of the pump 2, which is done before the pump 2 is switched on; when moving past the sensor 3, this marker substance likewise causes a deflection $a$ of the tracer instrument (see FIG. 2). The pumping time $t_2$ from the time the pump 2 is switched on until the deflection $a$ appears is a measure for the total length $e_1$ of the hose 1 (FIG. 1) and thus for that of the crude oil long-distance pipeline.

Figure 3:
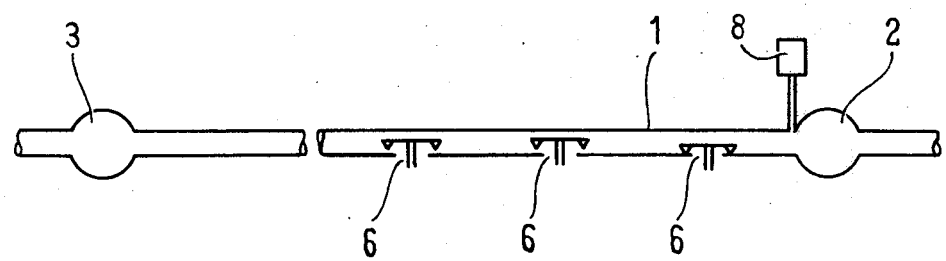
FIG. 3 shows an apparatus for the determination of concentration profiles in a different embodiment, shown schematically in a longitudinal sectional view.

An apparatus of this invention in a different embodiment is illustrated in FIG. 3. The hose 1 used herein has valves 6 at certain spacings, through which the substances can diffuse into the interior of the hose 1. These valves 6 are open to allow the substances to diffuse, when the hose 1 is not under pressure; the valves are closed automatically as soon as the pump 2 has produced the pressure necessary for pushing the column of test medium through the hose. While the test medium moves past the sensor 3, a recording is obtained corresponding to FIG. 2. In this embodiment, distilled water can be used, for example, as the test medium, and the sensor accordingly has ion-selective measuring elements and/or measuring probes for the electric conductivity of water. Thus it is possible to constantly monitor with the aid of this apparatus a groundwater drainage area for the seepage of undesired materials, because this apparatus can measure substance concentrations in the liquid phase along the path length.

The pump 2 can also exert a suction effect on the test medium, instead of a pressure action. It is obvious that in this case the sensor 3 is arranged at the same end of the hose 1 as the pump 2, whereas the device permitting the introduction of the substance serving as the distance marker is, in this case, disposed on the opposite hose end. If a hose 1 is utilized provided with valves 6, then the valves 6 must close in case of a vacuum.

Figure 4:
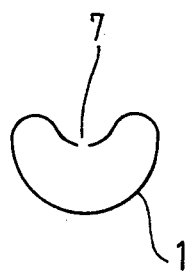
FIG. 4 shows a hose of a kidney-shaped cross section, provided with slots, the latter being open.
Figure 5:
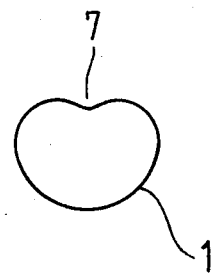
FIG. 5 shows the hose according to FIG. 4, the slots being closed.

However, in order to make it possible for the substances to penetrate into the interior of the hose 1, the latter can also have a kidney-shaped cross section in accordance with the illustration shown in FIG. 4, and can be provided with open slots 7 at certain intervals. As long as the pump 2 is inoperative, the slots 7 are open and permit liquid substances to diffuse into the interior of the hose 1, and thus the diffusion into the test medium in the form of distilled water or an indicator solution present in the hose. As soon as the pump 2 begins its operation and produces a pressure in the hose 1, the cross section of the hose 1 is deformed, as illustrated in FIG. 5, and the slots 7 close up, so that the column of the liquid test medium can be pushed through the hose 1 without leakage losses.

A hose 1 provided with slots 7 can also be used if the pump 2 operates under suction and produces a vacuum, or if a gaseous test medium (e.g. air) is being utilized. The substances present in gaseous form or the gases of liquid substances then diffuse into this gaseous test medium.

The dosing device 8 consists, for example, of a small flask containing the substance to which the sensor 3 is likewise sensitive. With the aid of a cylinder, a minor volume of the substance can be introduced into the interior of the hose 1 through an automatic valve.

What is claimed is:

1. A process for the determination of concentration profiles of liquid or gaseous substances along a path length comprising the steps of:
    a. laying a length of hollow conduit filled with a column of test medium along said path length, said hollow conduit being constructed to permit diffusion of said substances thereinto whereby a distribution corresponding to the concentration profile to be determined is established in said test medium;
    b. pushing the column of test medium through said conduit at chronological intervals; and
    c. moving the column past a sensor sensitive to said substances.

2. Process according to claim 1, wherein prior to pushing said column of test medium, a minor amount of a substance other than the substance to be detected to which the sensor is sensitive is introduced into said hollow conduit as a distance marker.

3. A process for the determination of concentration profiles of crude oil or gas along a pipeline installation transporting said crude oil or gas comprising the steps of:
    a. laying a length of hollow conduit in a direction substantially parallel to said pipeline and filled with a column of test medium, said hollow conduit being constructed to permit diffusion of said crude oil or gas thereinto whereby a distribution corresponding to the concentration profile to be determined is established in said test medium;
    b. providing a sensor sensitive to said crude oil or gas, said sensor being in communication with the interior of said hollow conduit;
    c. establishing an equilibrium between any crude oil or gas outside of said hollow conduit and any crude oil or gas diffused into said test medium in said hollow conduit;
    d. moving the column of test medium and any crude oil or gas diffused thereinto past said sensor whereby said concentration profile is determined; and
    e. pushing the column of test medium through said conduit at chronological intervals.

4. Process according to claim 3, wherein said test medium is comprised of air and said concentration profile to be determined is the concentration of crude oil in said air.

5. An apparatus for the determination of concentration profiles of liquid or gaseous substances along a path length comprising a hollow conduit along said path length and filled with a test medium, said hollow conduit being constructed so that said substances can diffuse into the interior thereof, pump means provided at one end of said hollow conduit for displacing said test medium therethrough and sensor means sensitive to said substances disposed along the length of said conduit at a predetermined distance from said pump means.

6. Apparatus according to claim 5, wherein said conduit comprises a polyethylene hose.

7. Apparatus according to claim 5, wherein valve means closing automatically under pressure or vacuum are arranged at spacings in the wall of said conduit.

8. Apparatus according to claim 5, further comprising a dosing device arranged at one end of said conduit permitting the introduction of said substance into said conduit.

9. Apparatus according to claim 5, wherein said conduit has a kidney-shaped cross-section and is provided with open slots at spacings along the length thereof which close automatically when a pressure or vacuum is produced in the interior of said conduit.

10. Apparatus according to claim 5, wherein said sensor means is comprised of ion-selective measuring elements.

11. Apparatus according to claim 5, wherein said said sensor means is comprised of probes for measuring the electric conductivity of water.

* * * * *